United States Patent
Rausch et al.

[11] Patent Number: 5,934,532
[45] Date of Patent: Aug. 10, 1999

[54] REMOVABLE STORAGE SYSTEM

[75] Inventors: Jeffrey S. Rausch, Royal Oak; Mark E. Laesch, Eastpointe, both of Mich.

[73] Assignee: Chrysler Corporation, Auburn Hills, Mich.

[21] Appl. No.: 08/733,038

[22] Filed: Oct. 16, 1996

[51] Int. Cl.⁶ .................................................. B60R 7/04
[52] U.S. Cl. .......................................... 224/544; 224/543
[58] Field of Search .............................. 224/482–4, 486, 224/539, 543–4, 311

[56] References Cited

U.S. PATENT DOCUMENTS

| | | | |
|---|---|---|---|
| D. 180,199 | 4/1957 | Perreault | 224/560 X |
| 1,790,977 | 2/1931 | De Boer | 224/557 X |
| 2,830,748 | 4/1958 | Faltin | 224/557 X |
| 2,832,498 | 4/1958 | Parsons | 224/543 X |
| 2,992,515 | 1/1961 | Barnes | 224/539 X |
| 4,180,299 | 12/1979 | Tolerson | 224/311 X |
| 4,256,245 | 3/1981 | Serres | 224/283 X |
| 5,205,447 | 4/1993 | Hambrick | 224/483 X |
| 5,246,190 | 9/1993 | Swirkal | 224/483 X |

*Primary Examiner*—Renee S. Luebke
*Attorney, Agent, or Firm*—William J. Coughlin

[57] ABSTRACT

A removable storage system is disclosed having a storage receptacle, a plurality of tabs connected to the receptacle, and a plurality of receiving openings integral with an interior member of a vehicle for receiving the tabs and retaining the receptacle. The tabs further may consist of grooves culminating in channels.

4 Claims, 4 Drawing Sheets

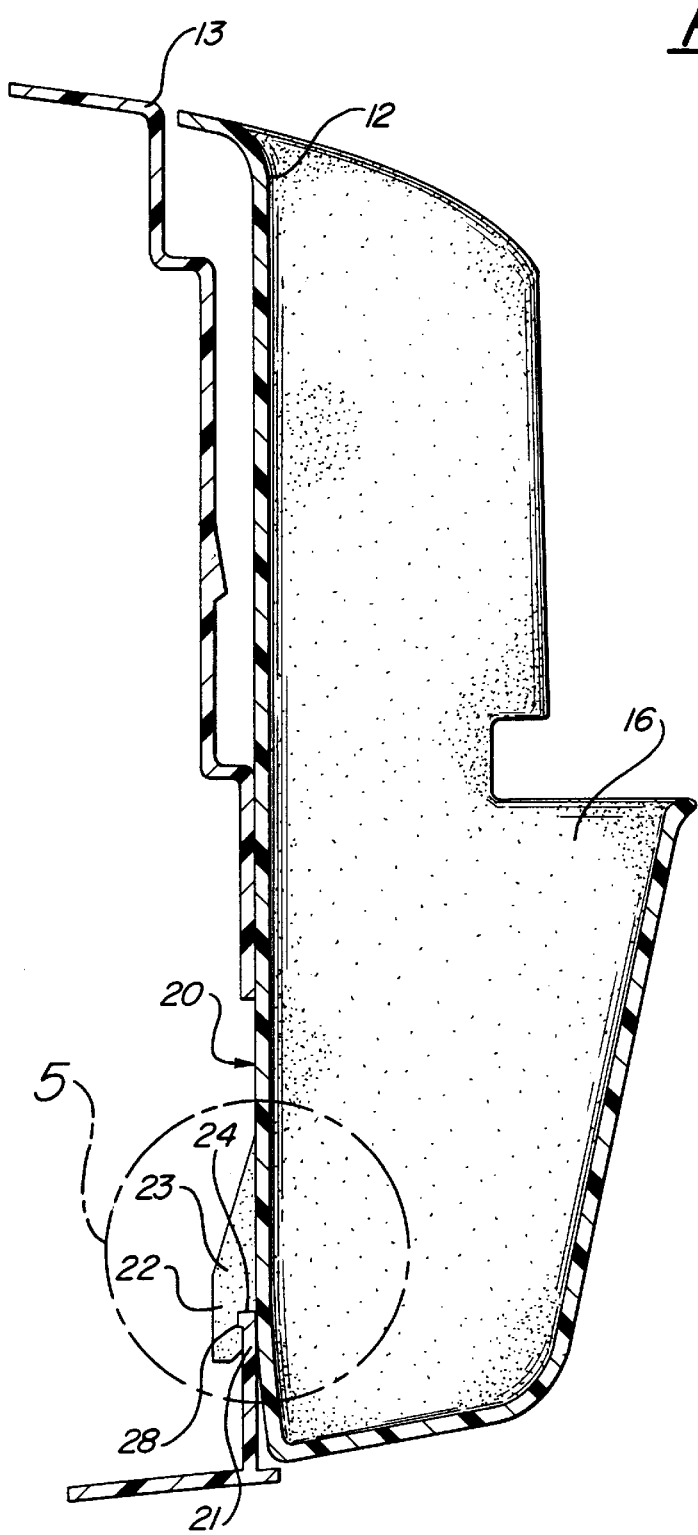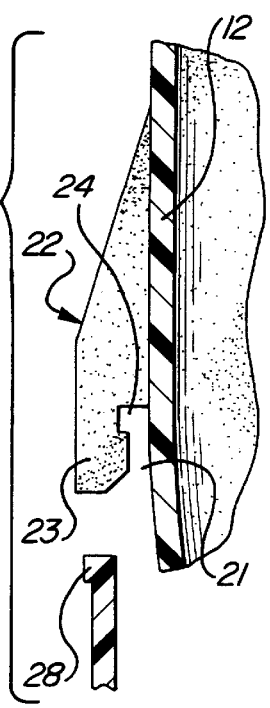

REMOVABLE STORAGE SYSTEM

BACKGROUND OF THE INVENTION

1. Field of the Invention

The present invention relates generally to vehicle interiors, and more particularly to a removable storage system for use in conjunction with a vehicle interior.

2. Description of the Related Art

Automobile interiors often contain various storage compartments and devices, including cup holders, glove boxes, and various storage openings defined by various interior components, such as door panels and consoles. It is desirable to have a storage container which may be removed from the vehicle interior if desired to free up interior space or to allow the operator of the vehicle to remove the container, for example to carry valuables in the container when leaving the vehicle to prevent theft.

SUMMARY OF THE INVENTION

Accordingly, it is an object of the present invention to provide a storage system that allows removal of a storage container from a vehicle interior. Therefore, claimed and disclosed herein is a removable storage system for a vehicle comprising a storage receptacle, a plurality of connecting means connected to the receptacle, and a plurality of receiving means on a vehicle interior member for receiving the connecting means and retaining the receptacle in place. Also disclosed are connecting means that further comprise tabs, the tabs further comprising grooves culminating in channels, with the receiving means further comprising openings defined by the vehicle interior member, the openings further comprising raised annular ridges around their perimeters for engagement with the channels. The vehicle interior component can be a quarter panel, an instrument panel, a trim panel, or any other suitable component.

The details of the present invention, both as to its structure and operation, can best be understood in reference to the accompanying drawings, in which like reference numerals refer to like parts and in which:

DESCRIPTION OF THE DRAWINGS

FIG. 4 is a cross-sectional view taken at line 4—4 of FIG. 1; and

FIG. 5 is a partially-exploded detail view of a portion of FIG. 4.

DETAILED DESCRIPTION OF THE INVENTION

Figure 1:
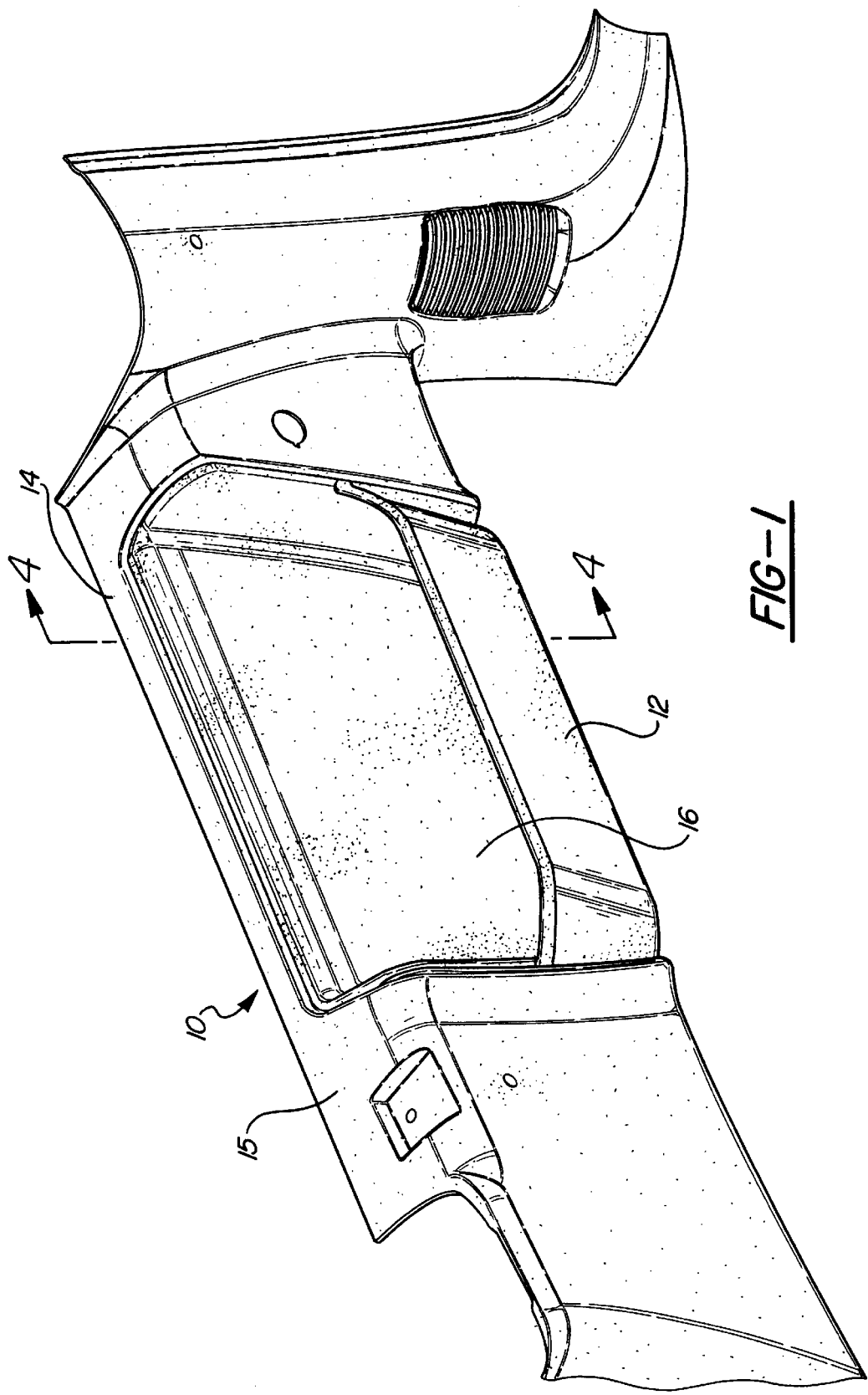
FIG. 1 is a perspective view of the removable storage system of the present invention with the means for storage installed.

Turning to FIG. 1, the removable storage system of the present invention is shown, installed in the rear quarter panel of a vehicle. System 10 comprises storage means 12 installed in rear quarter panel 14 of trim panel 15. In the embodiment shown, storage means 12 comprises an open-ended, box-like structure defining recess 16, into which articles to be stored may be placed. The storage means may comprise any size or shape receptacle desired, such as a box with a lid or a multi-compartmented box. The point of attachment similarly need not be the rear quarter panel, but may be the instrument panel, a trim panel, or any other desired point of attachment in the vehicle.

Figure 2:
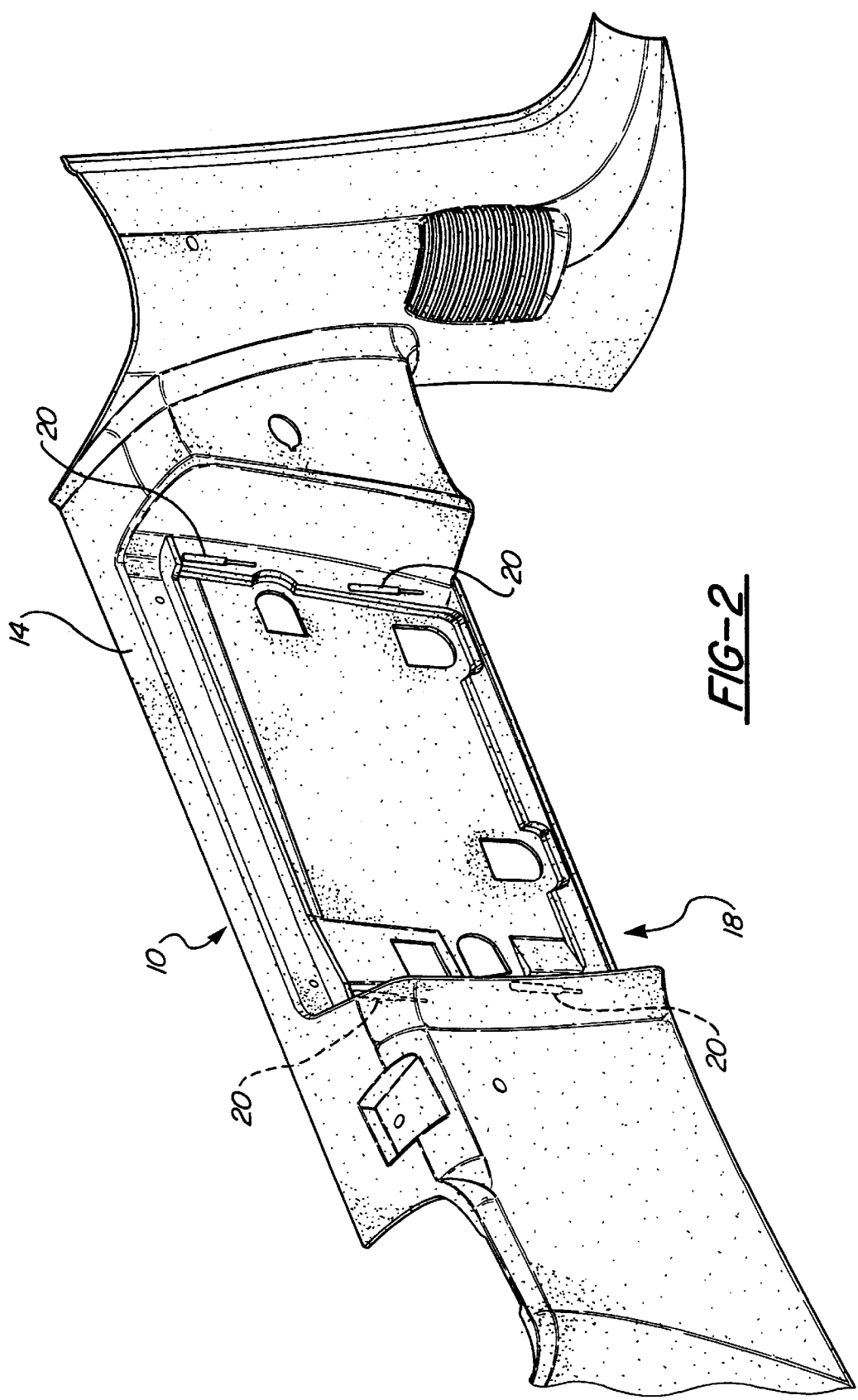
FIG. 2 is a perspective view of the removable storage system of the present invention with the means for storage removed.

FIG. 2 shows quarter panel 14 with the storage means removed. The panel defines cutout 18 for receiving the storage means. Depending on the point of attachment, the attachment point may or may not comprise such a cutout. For example, the storage means may be connected directly to a flat-surfaced component, without fitting into a cutout. Cutout 18 further defines a plurality of recesses 20 for receiving connecting means 22 (see FIG. 3). In the preferred embodiment the connecting means comprise tabs 23 further comprising grooves 21 culminating in channels 24 for snapping engagement with annular ridges 28 formed around the perimeters of the recesses 20 (see FIG. 4). The connecting means need not comprise this structure, however, and any suitable structure may be used for connection.

Figure 3:
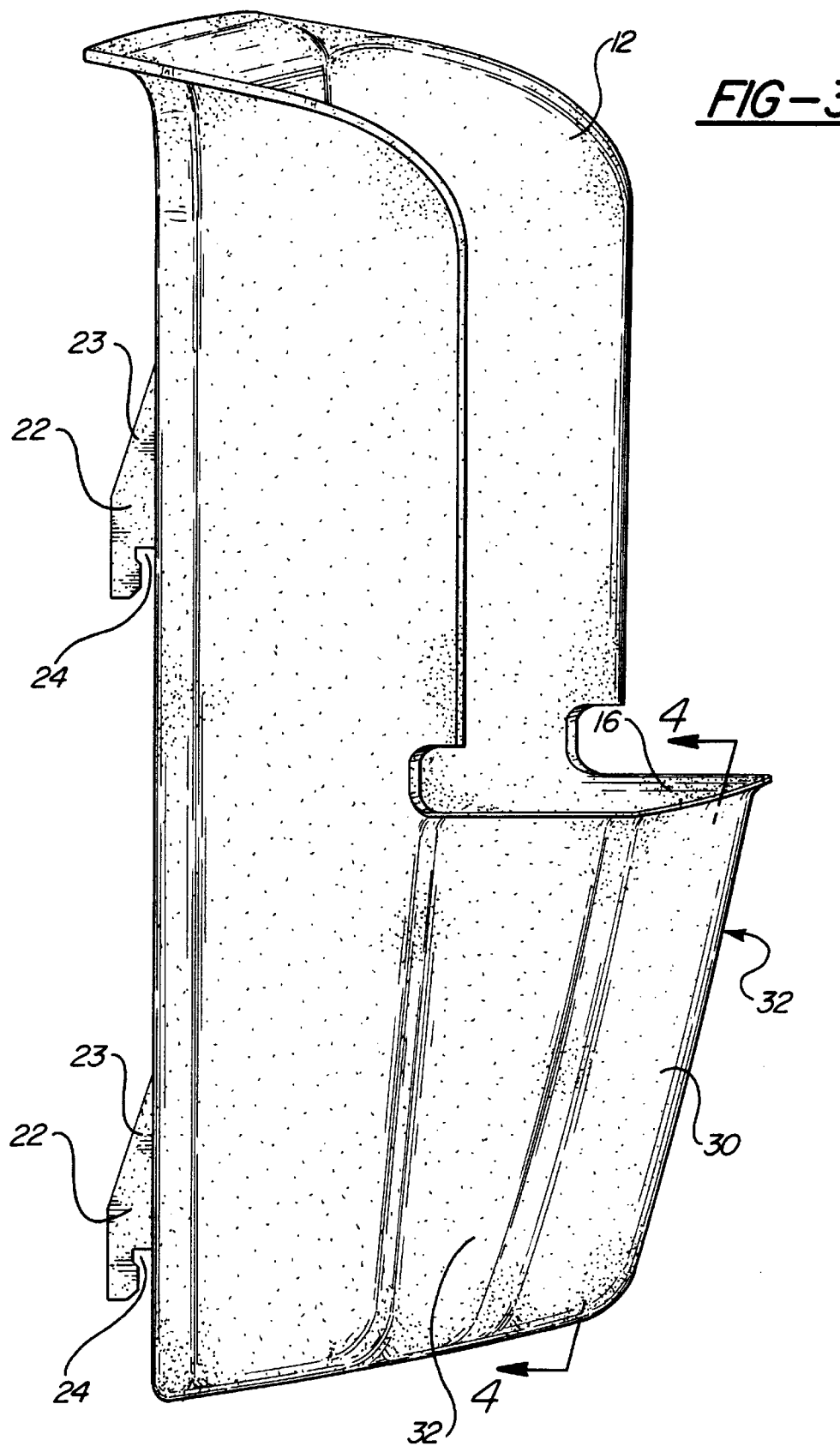
FIG. 3 is a perspective view of an embodiment of the means for storage of the present invention.

FIG. 3 and FIG. 4 show one embodiment of the storage means of the present invention, installed in instrument panel 13. Means 12 defines recess 16 further defined by front wall 30 and side walls 32. Again, the storage means may be shaped as desired. For example, the storage means may be fitted with a lid and a handle and valuables may be carried within the means when the passenger leaves the vehicle.

FIG. 5 shows the detail of the engagement of tabs 23 with the ridges 28. Grooves 21 culminating in channels 24 for snapping engagement with annular ridges 28 formed around the perimeters of the recesses 20.

While particular embodiments of the invention have been described above, the invention is not so limited. Alternative embodiments and modification which would still be encompassed by the invention may be made by those skilled in the art, particularly in light of the foregoing is teachings. Therefore, the following claims are intended to cover any alternative embodiments, modifications or equivalents which may be included within the spirit and scope of the invention as claimed.

We claim:

1. A vehicle comprising:
   a vertically-oriented storage receptacle having a rear panel, a recess and an open upper end;
   a plurality of tabs extending from said receptacle; and
   a plurality of openings defined by and passing at least partially through an interior member of said vehicle for receiving said plurality of tabs and retaining said receptacle, each opening defined by a rearwardly extending flange of said interior member;
   each tab of said plurality of tabs including a lower portion rearwardly spaced from said rear panel to define a horizontal channel and a vertical slot, said horizontal channel for receiving the rearwardly extending flange, said vertical slot for receiving said interior member, and said vertical slot connected to said horizontal channel.

2. The vehicle of claim 1, wherein said storage receptacle includes a pair of laterally spaced side walls and a front panel interconnecting a lower portion of each side wall of said pair of laterally spaced side walls, an upper portion of each side wall upwardly extending beyond said front panel.

3. The vehicle of claim 1, wherein said vertical slot has a horizontal dimension less than that of said rearwardly extending flange such that said rearwardly extending flange is in snapping engagement with said horizontal channel.

4. In combination with a motor vehicle, a storage system for the motor vehicle comprising:

- a receptacle defining a recess and having an open upper end;
- a plurality of tabs rearwardly extending from said receptacle; and
- a corresponding plurality of openings defined by a vehicle interior member for receiving said plurality of tabs and removably retaining said receptacle, each opening defined by a rearwardly extending flange;

said storage receptacle including a pair of laterally spaced side walls and a front panel interconnecting a lower portion of each side wall of said pair of laterally spaced side walls, an upper portion of each side wall upwardly extending beyond said front panel;

each tab of said plurality of tabs including a lower portion spaced horizontally from said receptacle to define a horizontal channel for receiving the rearwardly extending flange of said interior member and a vertical slot connected to said horizontal channel, said vertical slot having a horizontal dimension less than that of said rearwardly extending flange such that said rearwardly extending flange is in snapping engagement with said horizontal channel.

\* \* \* \* \*